US012261420B2

(12) United States Patent
Hanff et al.

(10) Patent No.: US 12,261,420 B2
(45) Date of Patent: Mar. 25, 2025

(54) CABLE PULLING RIG SYSTEM

(71) Applicant: Rosendin Electric, Inc., San Jose, CA (US)

(72) Inventors: Shawn Hanff, Longmont, CO (US); Steve Eichelberger, Bay City, TX (US); William Paul Mazzetti, Jr., San Francisco, CA (US)

(73) Assignee: Rosendin Electric, Inc., San Jose, CA (US)

( * ) Notice: Subject to any disclaimer, the term of this patent is extended or adjusted under 35 U.S.C. 154(b) by 165 days.

(21) Appl. No.: 17/721,030

(22) Filed: Apr. 14, 2022

(65) Prior Publication Data

US 2022/0352698 A1 Nov. 3, 2022

Related U.S. Application Data

(60) Provisional application No. 63/182,496, filed on Apr. 30, 2021.

(51) Int. Cl.
*H02G 1/08* (2006.01)
*H02G 9/02* (2006.01)
*H02S 40/36* (2014.01)

(52) U.S. Cl.
CPC ............... *H02G 1/081* (2013.01); *H02G 9/02* (2013.01); *H02S 40/36* (2014.12)

(58) Field of Classification Search
CPC .. H02G 1/00; H02G 1/02; H02G 1/04; H02G 1/06; H02G 1/08–10; H02G 9/06; H02G 9/065; H02G 9/08; H02G 9/10; B25H 3/04
See application file for complete search history.

(56) References Cited

U.S. PATENT DOCUMENTS

| 4,332,511 | A | 1/1982 | Bradley et al. |
| 4,579,310 | A | 1/1986 | Wells et al. |
| 5,167,399 | A | 12/1992 | Delomel |
| 5,595,355 | A * | 1/1997 | Haines ..................... H02G 1/06 242/563.2 |
| 6,267,355 | B1 * | 7/2001 | Fletcher ................... H02G 1/08 242/615 |
| 2007/0286681 | A1 | 12/2007 | Parent |

OTHER PUBLICATIONS

International Searching Authority; Notification of Transmittal of the International Search Report and the Written Opinion of the International Searching Authority, or the Declaration, dated Jul. 29, 2022, 16 pages.

* cited by examiner

*Primary Examiner* — Tyrone V Hall, Jr.
(74) *Attorney, Agent, or Firm* — Rutan and Tucker, LLP

(57) ABSTRACT

A cable pulling system that has at least a cable pulling jig, a wire guide and management jig, and a mechanical coupling to attach the cable pulling jig to a first vehicle to pull multiple cables. The wire guide and management jig helps manage the multiple cables to prevent the multiple cables from i) tangling ii) getting out of alignment, and iii) any combination of both, while being pulled.

18 Claims, 13 Drawing Sheets

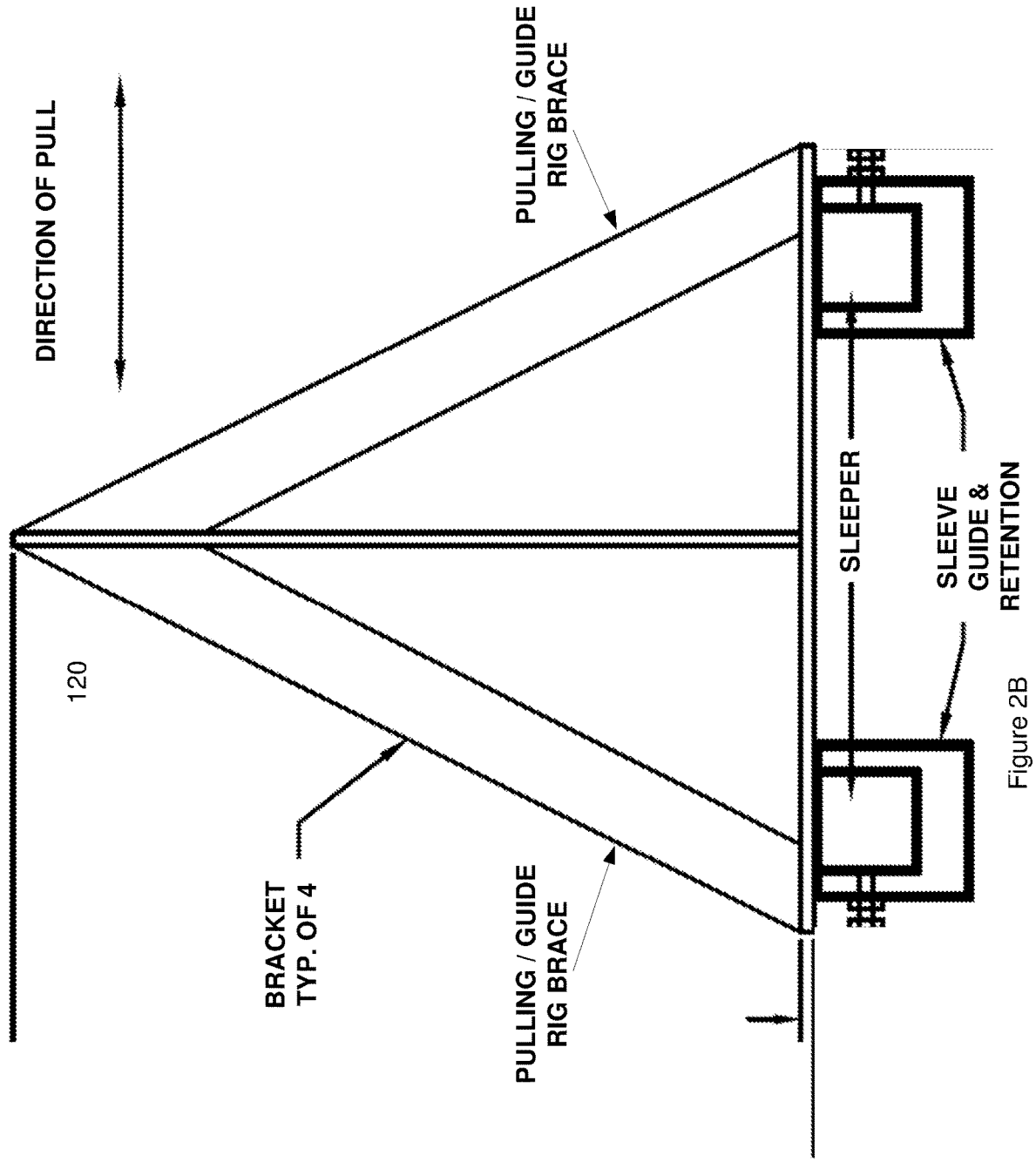

CABLE PULLING RIG SYSTEM

RELATED APPLICATION

This application claims priority under 35 USC 119 to U.S. provisional patent application Ser. 63/182,496, titled "SOLAR ARRAY POWER CABLE PULLING RIG," filed 30 Apr. 2021, which the disclosure of such is incorporated herein by reference in its entirety.

TECHNICAL FIELD

Embodiments of this disclosure relate generally to a cable pulling rig.

BACKGROUND

Installing cabling for solar modules in a solar farm can be done by hand by crews of people.

SUMMARY

Provided herein are various methods, apparatuses, and systems for cable pulling rig. In an embodiment, a cable-pulling-rig-system enables electrical power system cabling installation, and in a specific case the installation of electrical power cables through an open tray system in a solar power array farm.

The cable-pulling-rig-system can include a cable pulling jig, a wire guide and management jig, one or more vehicles to couple to the cable pulling jig to pull multiple cables and the wire guide and management jig, and other components. The wire guide and management jig is constructed to help manage the multiple cables to prevent the multiple cables from i) tangling ii) getting out of alignment, and iii) any combination of both, while being pulled.

These and many more embodiments are discussed.

DRAWINGS

The Figures below for this application show example embodiments of aspects of this design.

FIGS. 1A and 1B illustrate diagrams of an example vehicle (e.g., forklift) with its arms (e.g., forks) going through the mechanical coupling (e.g., sleeve retention) fabricated into the platform supporting the wire guide and management jig on one side and the counterweight on the other side as well as (on the side figure) shows the multiple cables, each, individually going through a corresponding hole in a matrix of holes formed in a plate of the rectangular wire guide and management jig when the arm of the vehicle has raised the wire guide and management jig and its multiple cables into the air.

FIG. 2B illustrates a side view of an example mechanical coupling for the wire guide and management jig in the center of a pair of steel beams that couple to the legs/braces supporting the plate of the cable pulling jig as well as the counterweight for the wire guide and management jig.

Figure 9:
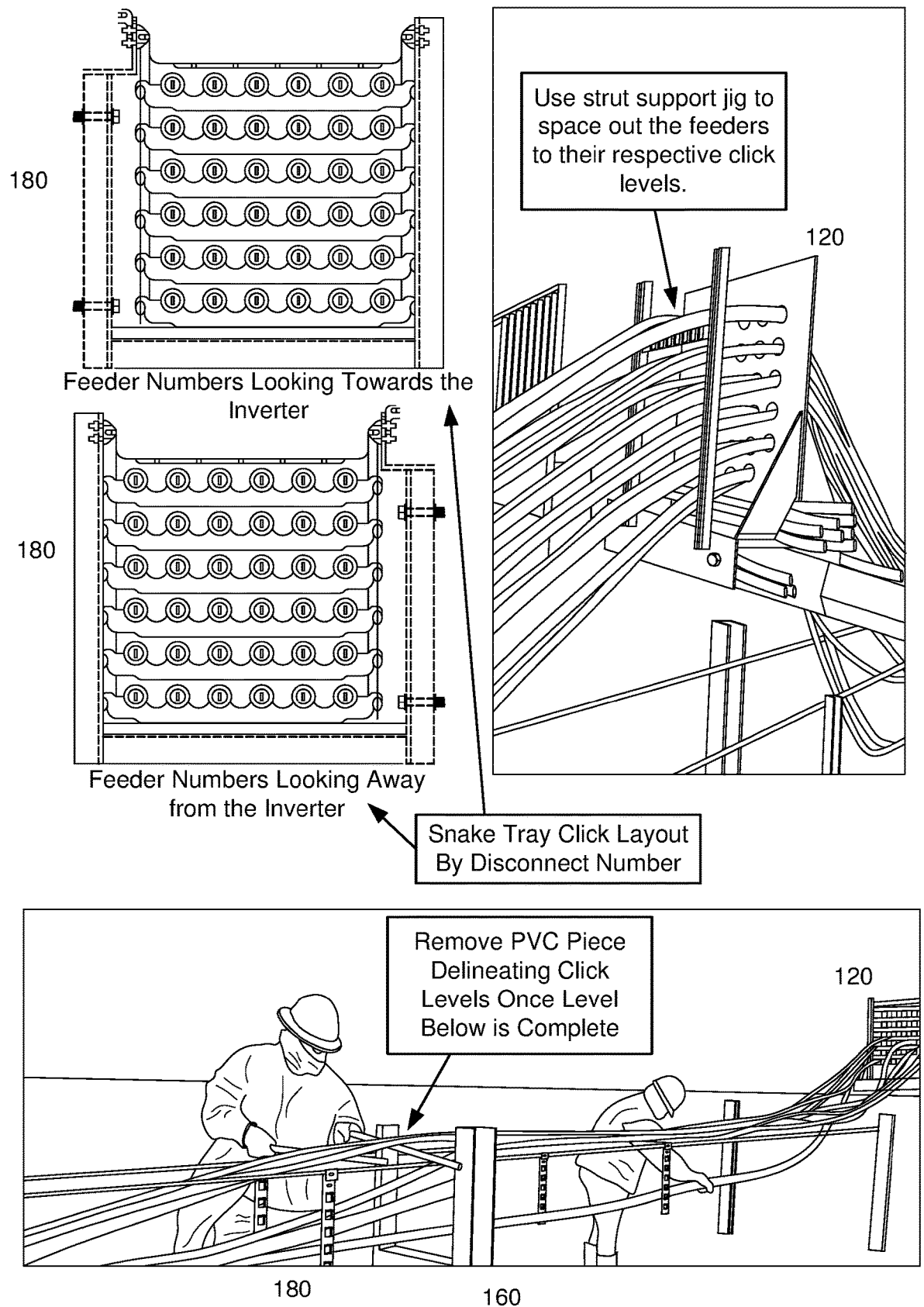

FIG. 9 illustrates a diagram of an example wire guide and management jig having its set of holes in the steel plate to maintain cable logistics of an identity of each cable being pulled as well as to maintain each separate cable's orientation relative to another cable being pulled at the same time, which helps to prevent the multiple cables from i) tangling ii) getting out of alignment, and iii) any combination of both, while being pulled.

Figure 10B:
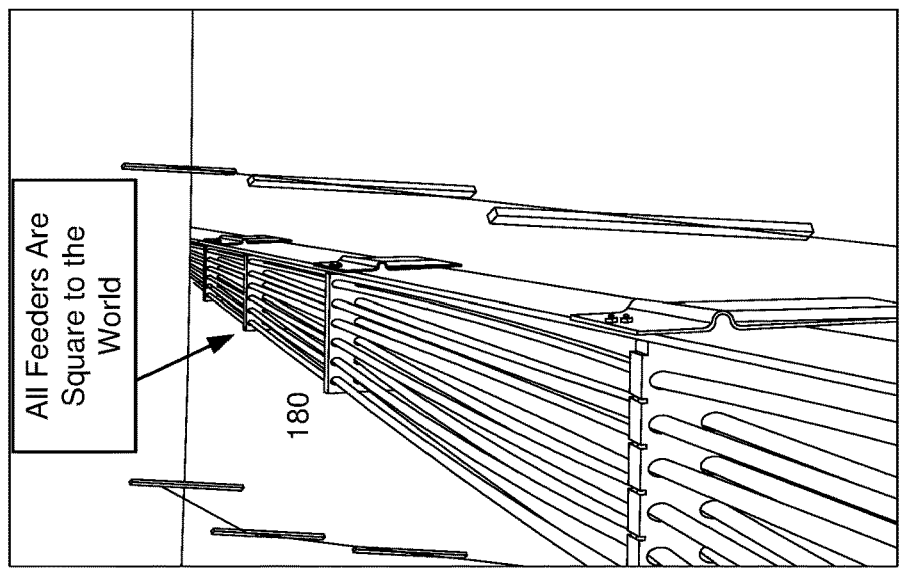
Figure 10A:
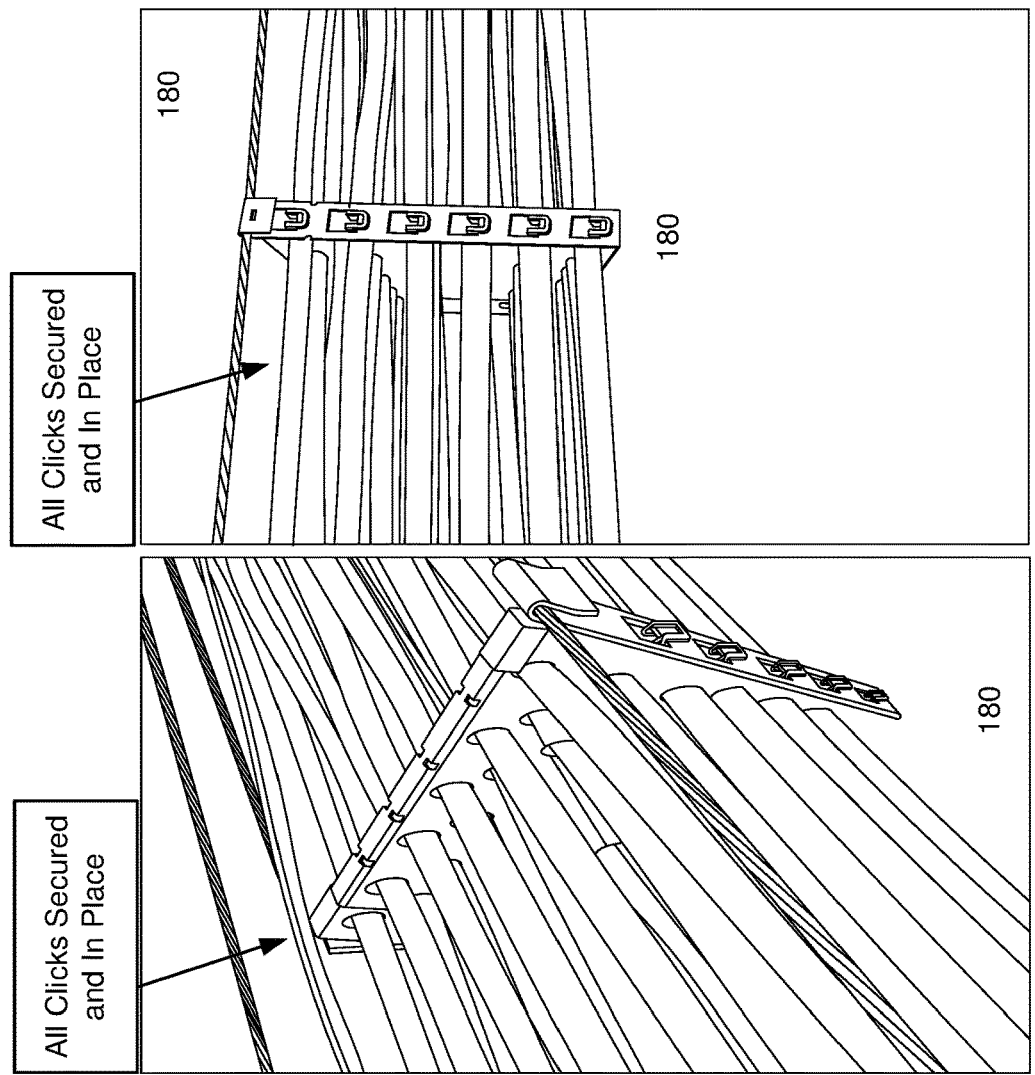

FIGS. 10A and 10B illustrate a diagram of multiple views of examples of multiple cables having been pulled down a row of solar arrays and installed into their respective cable management system (e.g., snake tray structure).

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details can be set forth, such as examples of specific data signals, named components, number of poles, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as the first cable tray, can be made. However, the specific numeric reference should not be interpreted as a literal sequential order but rather interpreted that the first cable tray is different than a second cable tray. Thus, the specific details set forth can be merely exemplary. The specific details can be varied from and still be contemplated to be within the spirit and scope of the present design. The term "coupled" is defined as meaning connected either directly to the component or indirectly to the component through another component.

The cable pulling system can include a cable pulling jig, a wire guide and management jig, one or more vehicles to couple to the cable pulling jig to pull multiple cables, and other components. The cable-pulling-rig-system, such as a Solar Array Power Cable Pulling Rig system, replaces by-hand installation. This varies significantly from hand-installation or electrically-powered cable pulling tools where there is significant manpower to draw and pull cables over the large distances seen in, for example, utility-level solar installations.

Figure 1A:
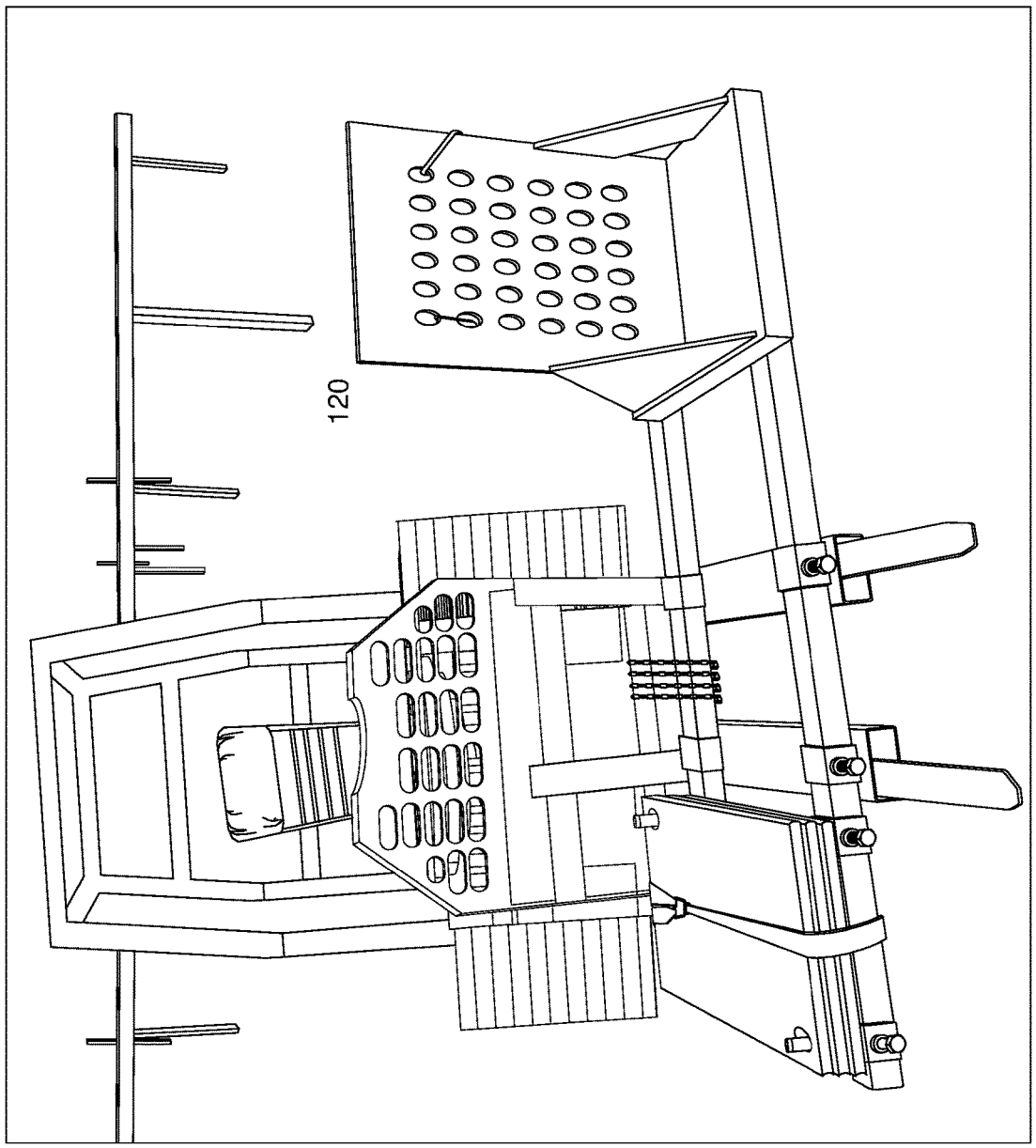
Figure 1B:
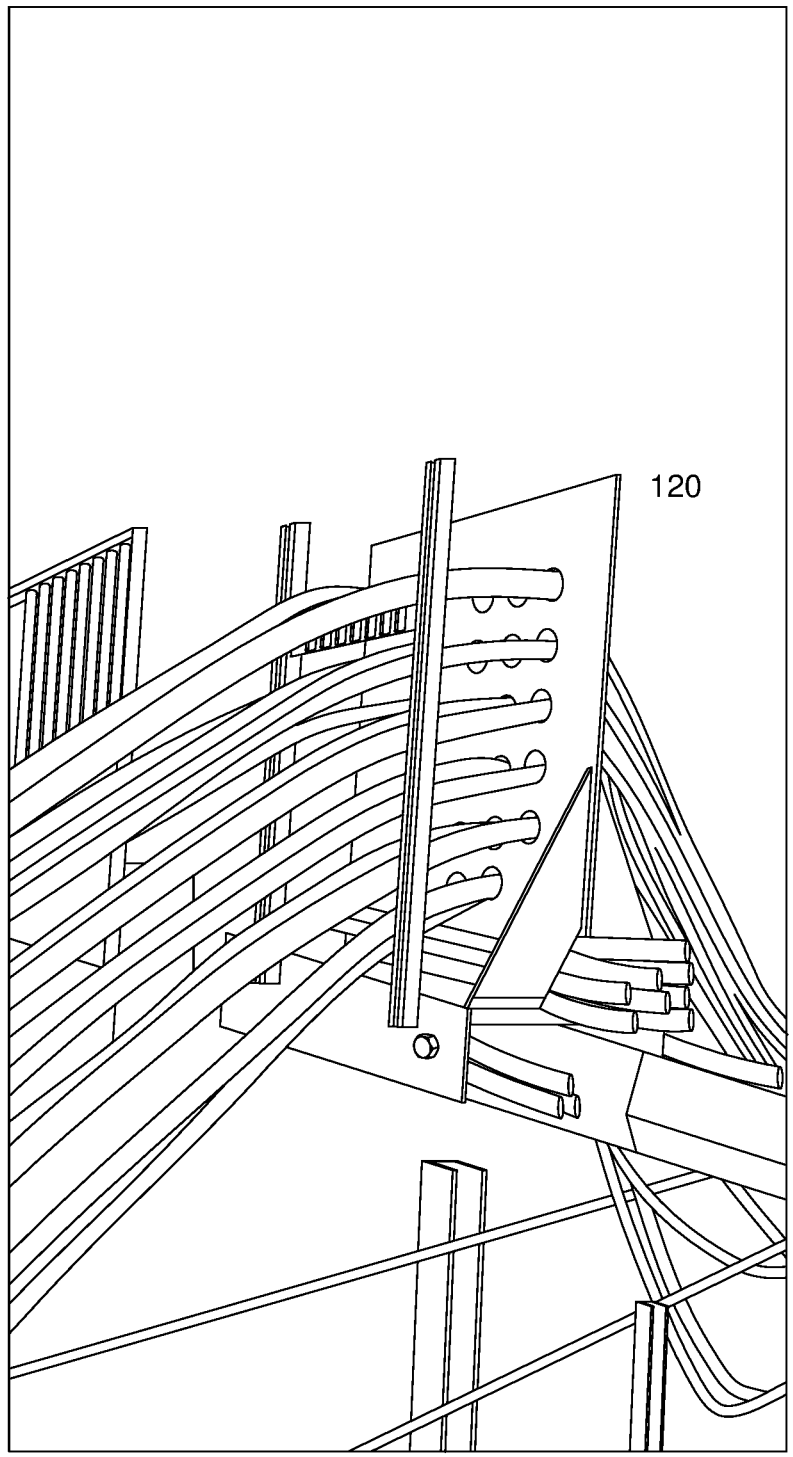

FIGS. 1A and 1B illustrate diagrams of an example vehicle (e.g., forklift) with its arms (e.g., forks) going through the mechanical coupling (e.g., sleeve retention) fabricated into the platform supporting the wire guide and management jig (on one side) and the counterweight (on the other) side. FIG. 1B illustrates a diagram of an example of multiple cables, each, individually going through a corresponding hole in a matrix of holes formed in a plate of the rectangular wire guide and management jig 120 when the arm of the vehicle has raised the wire guide and management jig 120 and its multiple cables into the air. The wire guide and management jig 120 is constructed to help manage the multiple cables to prevent the multiple cables from i) tangling ii) getting out of alignment, and iii) any combination of both, while being pulled. The wire guide and management jig 120 can be constructed from a steel plate with a set of identifying labeled holes (e.g., matrix of holes) for the multiple cables to be pulled through and has a mechanical coupling to attach to a vehicle. The steel plate with the identifying labeled holes can be constructed such that each cable, in the multiple cable pull, is configured to individually be routed through its corresponding identified labeled hole in the plate of the wire guide and management jig 120. The set of identifying labeled holes in the steel plate are configured to maintain cable logistics of an identity of each cable being pulled as well as are geographically located in the steel plate to maintain each separate cable's orientation relative to another cable being pulled at the same time, which helps to prevent the multiple cables from i) tangling ii) getting out of alignment, and iii) any combination of both, while being pulled. The wire guide and management jig 120 can be made up, in this example, of a row of six holes, each individually spaced and aligned relative to each other, and six columns of holes for a total of 36 holes. A mechanical coupling, such as a sleeve guide, can be bolted directly to the metal plate and/or welded to the metal plate of the wire guide and management jig 120 and/or mechanically linked via both being attached to a common steel tube. Likewise, a retention bar as the mechanical coupling may be welded and/or bolted to the bottom of the plate on both sides to the steel metal tubes forming the structure connecting the wire guide and management jig 120 and the counter weight. The holes in the plate can be drilled, such as 2 inch drilled holes with 1.5 inch chase nipples and rounded/smoothed on both sides of the holes to prevent any damage to the cables passing through the wire guide and management jig 120. The wire guide and management jig 120 may have legs and brackets to help brace the plate in place as it is mounted and secured to a steel bar on a bottom of the wire guide and management jig 120.

Figure 2A:
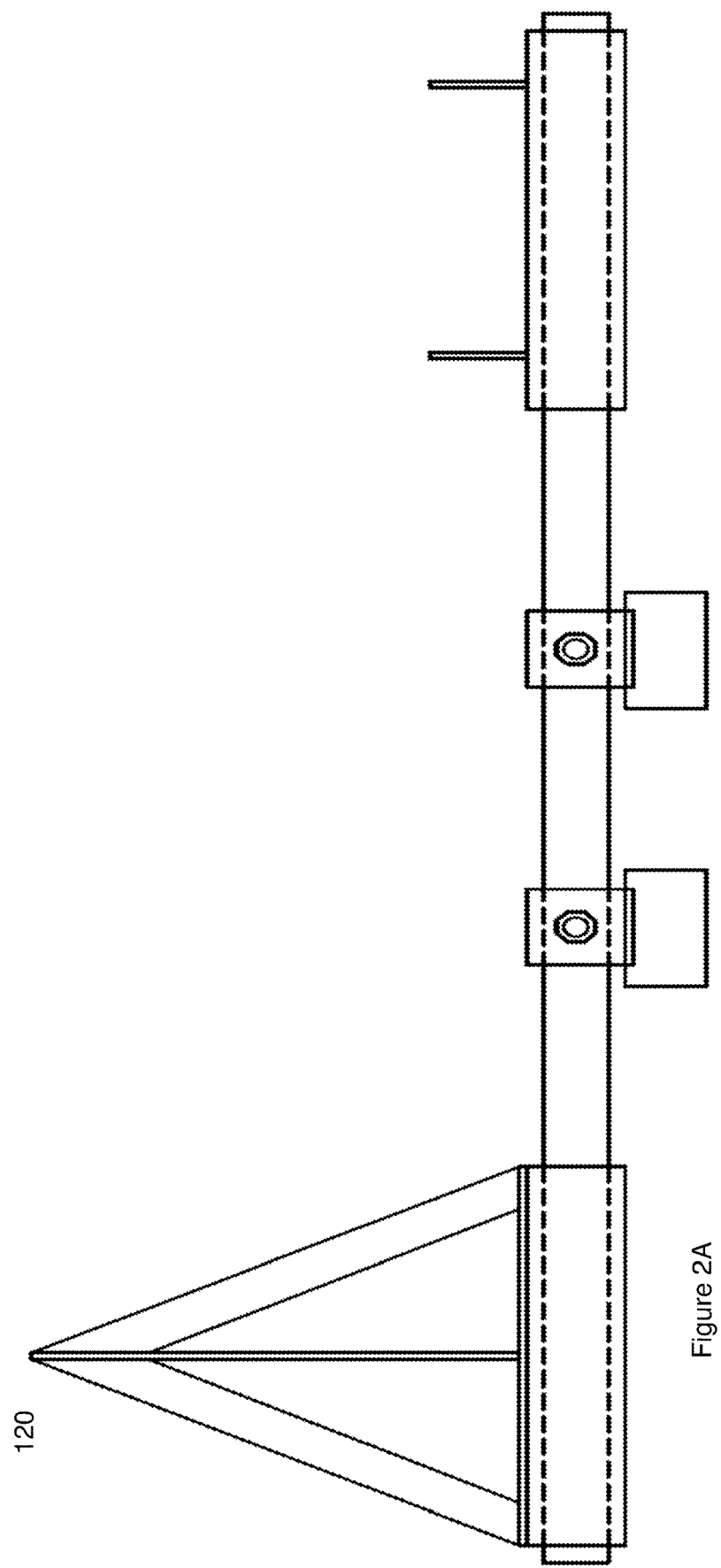
FIG. 2A illustrates a straight-on view of an example mechanical coupling (e.g., sleeve retention) for the wire guide and management jig in the center of a pair of two steel beams that couple to the legs/braces supporting the plate of the cable pulling jig as well as the counterweight for the wire guide and management jig.

FIG. 2A illustrates a straight-on view of an example mechanical coupling (e.g., sleeve retention) for the wire guide and management jig in the center of a pair of two steel beams that couple to the legs/braces supporting the plate of the cable pulling jig as well as the counterweight for the wire guide and management jig. FIG. 2B illustrates a side view of an example mechanical coupling for the wire guide and management jig in the center of a pair of steel beams that couple to the legs/braces supporting the plate of the cable pulling jig as well as the counterweight for the wire guide and management jig. The wire guide and management jig 120 connects to two metal tubes with the legs/braces of the wire guide and management jig 120, and to the example sleeve guides for the forks on the forklift, as well as to the counterweight, via the metal tubes on the bottom. Note, the sleeve guides for the forks on the forklift allow the forks to penetrate through the mechanical coupling, e.g., sleeve guide, connected to or formed with a portion of the metal tubes. The counterweight also connects to both of the metal tubes. The counterweight is on one side of the metal tubes. The wire pulling guide and management jig is on the other side of the metal tubes. The mechanical coupling to arm and/or head of the vehicle is located in the middle of the metal tubes.

Figure 3A:
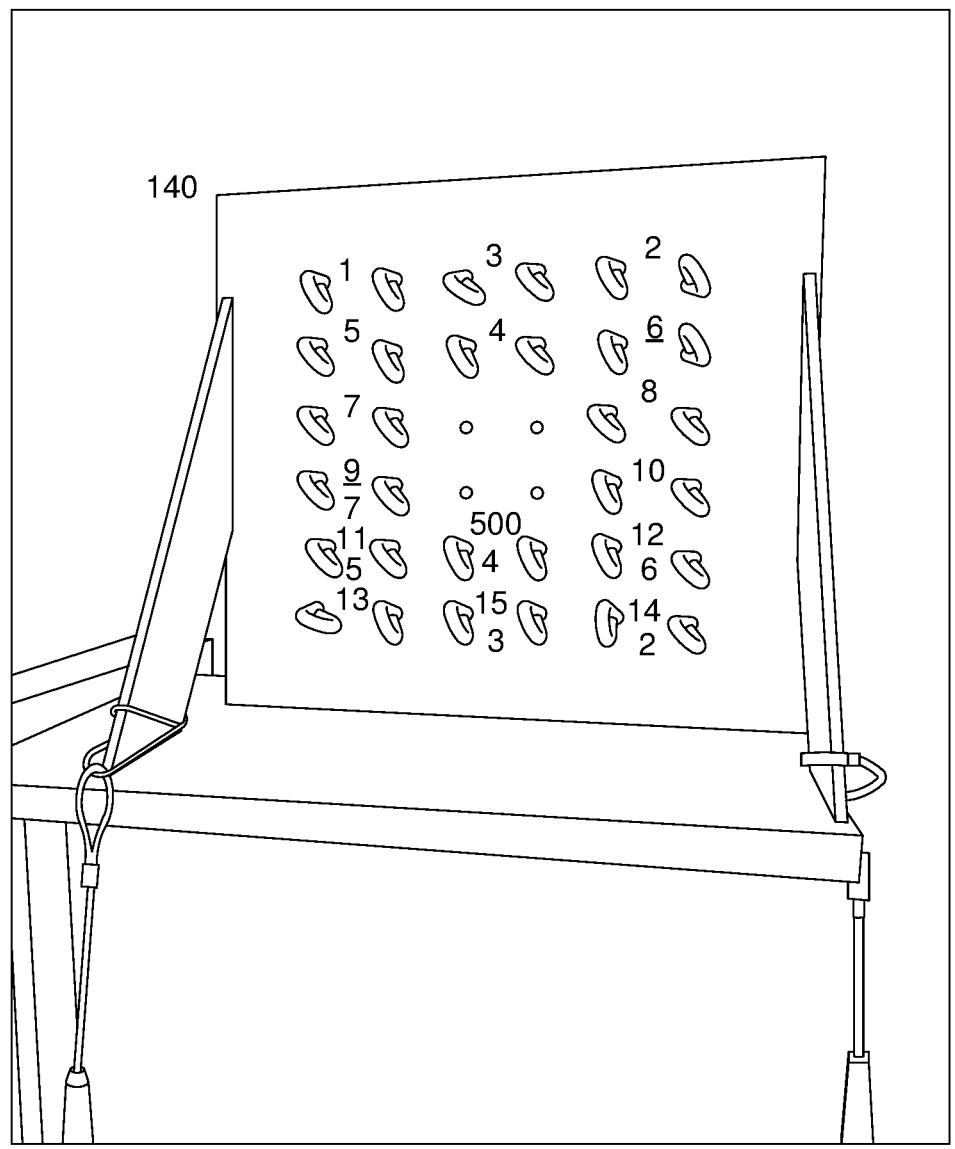
FIGS. 3A and 3B illustrate diagrams of an example cable pulling jig constructed from a metal plate with its set of identifying labeled hooks for prefabricated eyelets crimped onto an end of each of the multiple cables; and thus, temporarily coupled to that cable pulling jig.
Figure 3B:
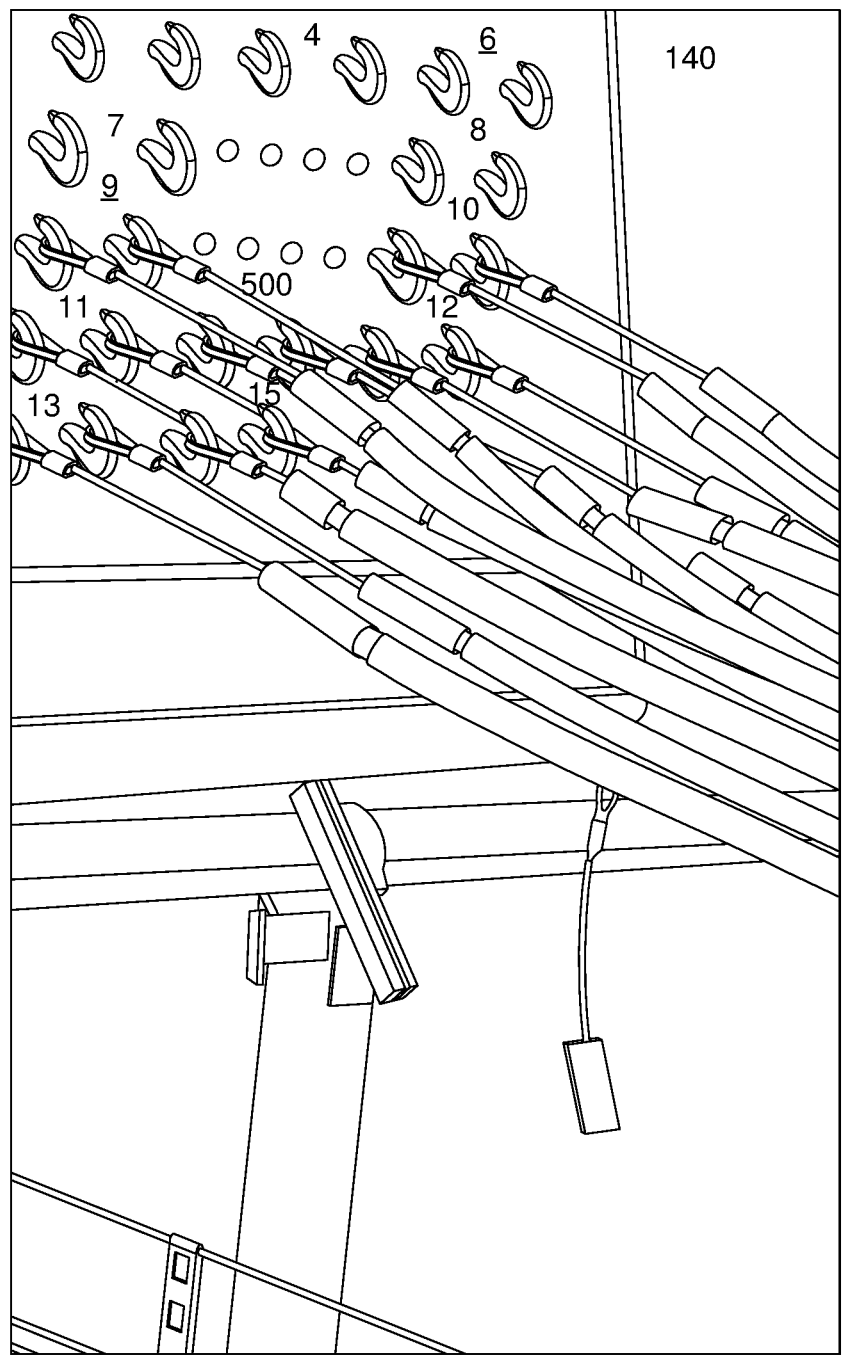

FIGS. 3A and 3B illustrate diagrams of an example cable pulling jig constructed from a metal plate with its set of identifying labeled hooks for prefabricated eyelets crimped onto an end of each of the multiple cables; and thus, temporarily coupled to that cable pulling jig. The set of identifying labeled hooks numbered, in this example, 1 through 15 and number 500. The cable pulling jig 140 can be constructed from a rectangular metal plate, such as a 0.5 to 1.5 inch thick steel plate, with a set of identifying labeled 1) holes, 2) prefabricated eyelets, 3) hooks, and 4) any combination of these, for the multiple cables to be temporarily coupled to the cable pulling jig 140. The feeders of the multiple cables are pulled through the wire guide and management jig 120, then are hooked to, for example, the prefabricated eyelets on the cables on to the hooks built into the cable pulling jig 140. The plate of the cable pulling jig 140 can also be manufactured from the same process used to produce the plate of the wire guide and management jig 120. In this example, the plate would have a row of six holes, each individually spaced and aligned relative to each other, and six columns of holes for a total of 36 holes. A sleeve guide can be bolted to the metal plate or welded to the metal plate. Likewise, the holes can be drilled such as 2 inch drilled holes with 1.5 inch chase nipples. The cable pulling jig 140 will have an equal number of hooks to the number of holes in the wire management jig typically. An example ¾ inch bolt with a spring gate hook can goes through the hole in the cable pulling jig 140 and it's bolted on the vertical plate with a washer on the other side. This allows the hook to change in its diameters to accommodate different cables sizes and different eyelet diameter connections coming from feeder cables. Alternatively, the plate may not be drilled but rather have prefabricated hooks welded to the locations where the holes would have been drilled. The cable pulling jig 140 may have legs and brackets to help brace the plate in place as it is mounted and secured to the steel bar. The square tubes connecting the arm of the vehicle to the braces/legs of the cable pulling jig 140 can be welded on both sides as the mechanical coupling to the vehicle so that the vehicle can always pull forward regardless of driving facing North, South, East and/or West. The mechanical coupling mechanically connects to an arm or head of a vehicle, such as a fork of a forklift, blade of a bulldozer, etc. and can be welded or held in place with, for example, a three-quarter inch retention bolt and nut on the other side. The cable pulling jig 140 can be constructed to use the mechanical coupling to couple to the vehicle, which then is configured to drive the multiple cables temporarily coupled to the cable pulling jig 140 off their cable reels to a desired location, such as an end of a cable tray. The mechanical coupling to the forklift can be a sleeve retention where the forks of the forklift penetrate through the sleeper retention to hold the wire management and jig in place when the cables are being pulled. The arm of the vehicle mechanically coupled to the cable pulling jig 140 is configured to lift the multiple cables temporarily coupled to the cable pulling jig 140 cantilevered over top of a cable tray when being pulled.

Overall, the cable-pulling-rig-system can include a set of components including a wire guide and management jig 120 mounted on first vehicle (e.g., an earth mover, a bulldozer, a forklift, a tractor, etc.) cooperating with a cable pulling jig 140 mounted on a second vehicle. The cable-pulling-rig-system can be a two-part system. One part of the cable-pulling-rig-system is cable pulling with a cable pulling jig 140 and a vehicle, while another part of the cable-pulling-rig-system is cable management with a wire guide and management jig 120, a cable management system 180, and optionally another vehicle, cable layer separators (e.g., PVC tubes), and vertical cable support posts 160 (e.g., PVC tubes in a shape of a goal post). The combination of the two parts is to draw cable off the delivery vehicle (e.g., a flatbed trailer) (see FIG. 4 for example) in which the cable reels are located through the wire guide and management jig 120 to guide the pulled cable into that site's desired cable management system 180, such as a cable tray. As discussed, the cable pulling system can include multiple reels of cable, a cable pulling jig 140, and an example vehicle, such as an earthmover, as the main energy source to pull the cables, the wire guide and management, and other components. The wire pulling crew routes and sets the cables into the wire guide and management jig 120 and hooks them onto the cable pulling jig 140, which is then pulled into/over the cable management system 180 (see FIG. 7 for example). This then allows the cable pulling crew to lay cable directly into the cable management system 180 (see FIG. 9 for example). The cable-pulling-rig-system can be specifically designed to pull cable in a site's exposed cable management system 180, in which the exposed cable management system 180 is a snake tray click structure. In an embodiment, the cable-pulling-rig-system can be used to pull power cables for a solar power farm consisting of rows of solar arrays and their trackers.

Referring back to FIGS. 1A and 1B, the wire management system can include the wire guide and management jig 120. The wire guide and management jig 120 is a passive device. The wire guide and management jig 120 can be constructed with welding and metal fabrication. In an embodiment, the wire guide and management jig 120 can have a plate with holes, labeled holes in the wire guide and management jig 120, and optionally legs, a wire ramp behind the plate, a sleeper/guide retention, a counter weight stabilizer, etc. Each cable, in the cable pull, is typically routed through its corresponding hole in the plate. The optional cable ramp can relieve rotational forces on the plate and dresses cables prior to passing through the guide. The wire guide and management jig 120 is coupled to a counter weight stabilizer to assist in stabilizing the wire guide and management jig 120 and a vehicle coupled to the wire guide and management jig 120 when pulling the multiple cables. The sleeve retention guide can be an example coupling mechanism to the fork of the forklift. For example, the prongs of the fork can slide inside the arms of the sleeve retention guide and secured in place. The sleeve retention guide can also simply be welded to a part (e.g., forklift) of the vehicle. Thus, in this example the wire guide and management jig 120 is mounted on a forklift and raised to the proper installation height.

The wire guide and management jig 120 and the cable pulling jig 140 are passive devices that are constructed to attach to, for example, one or two gas-driven or electric-driven vehicles.

Delivery vehicle with cabling driven on a job site close to, for example, a beginning of a row of a solar power arrays and then pulled by one or more vehicles with the wire guide and management jig and the cable pulling jig to the termination of the cables in a piece of electrical gear at an end of, for example, the other end of the row of solar power arrays.

Figure 4:
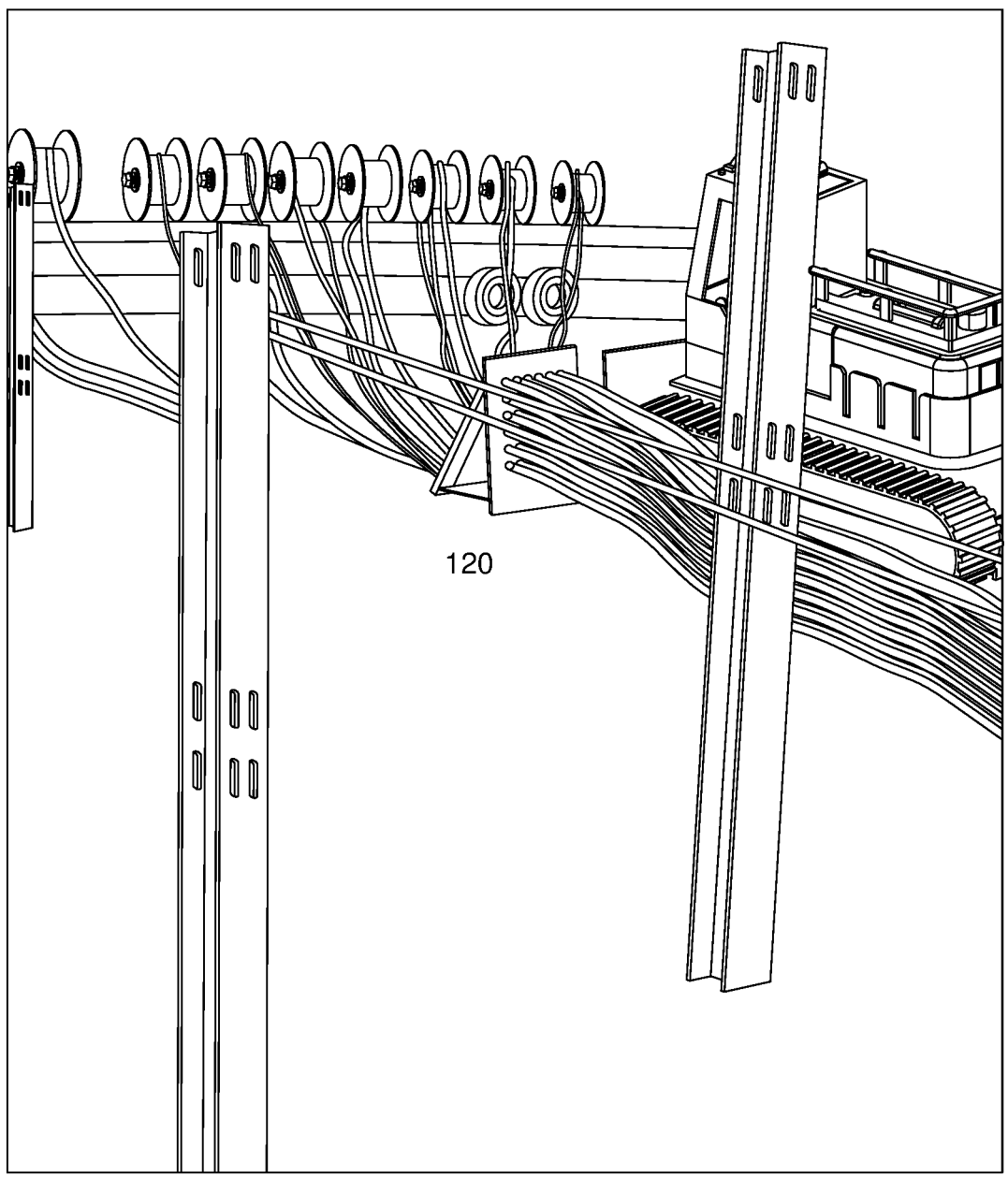
FIG. 4 illustrates a diagram of an example of a delivery vehicle with multiple cable reels where each of the cable reels feeds a cable to a wire guide and management jig through the holes of the wire guide and management jig.

FIG. 4 illustrates a diagram of an example of a delivery vehicle with multiple cable reels where each of the cable reels feeds a cable to a wire guide and management jig through the holes of the wire guide and management jig. As shown, the wire guide and management jig 120 is attached through its mechanical coupling to an arm, such as a fork, of a forklift. The cable pulling system can include the cable pulling jig 140. The cable pulling jig 140 is constructed to draw the multiple cables off a delivery vehicle (e.g., a flatbed trailer), where the multiple cables each on its own cable reel are located. The reels of cable on a bed of a delivery vehicle are positioned so that the middle, front facing cable reels of cable for the longer feeder cable pulls are directly perpendicular with the cable tray. The cable reels of cable near the front and the back will be angled toward the cable tray, allowing all the feeder cables to be pulled into the cable tray. While the cable-pulling-rig-system is equipment-mounted, one or more workers can draw/pull cable from cable reel on a flatbed trailer-mounted cable management system 180 that feeds cable to the cable pulling jig 140. This delivery vehicle (e.g., trailer truck) based system holds several large reels of cable for the installation, and this trailer-based cable reel spooling system assists the cable-pulling-rig-system to achieving the productivity goals that have been set. In an example, the cable-pulling-rig-system pulls the wire/cables off a truck through the one or more jigs, such as the wire guide and management jig 120, until the crew is finished pulling each of the cables being through holes in the jig. The cables can be temporarily coupled to the cable pulling jig 140. The cable pulling jig 140 couples to a vehicle which then drives the cable pulling jig 140 and the attached cables being pulled off their reels to a desired location, such as a cable tray, while the cable pulling jig 140 and the attached cables are cantilevered over top of a cable tray. The cable pulling jig 140 is constructed to draw the multiple cables off a delivery vehicle through the wire guide and management jig 120 to guide each pulled cable into a job site's desired cable management system 180, such as a cable tray. The cable pulling jig 140 is configured to draw the multiple cables off cable reels through the wire guide and management jig 120, and then the cable pulling jig 140 is configured to temporarily attach to the multiple cables when they are pulled through the wire guide and management jig 120 to a desired location.

Figure 5:
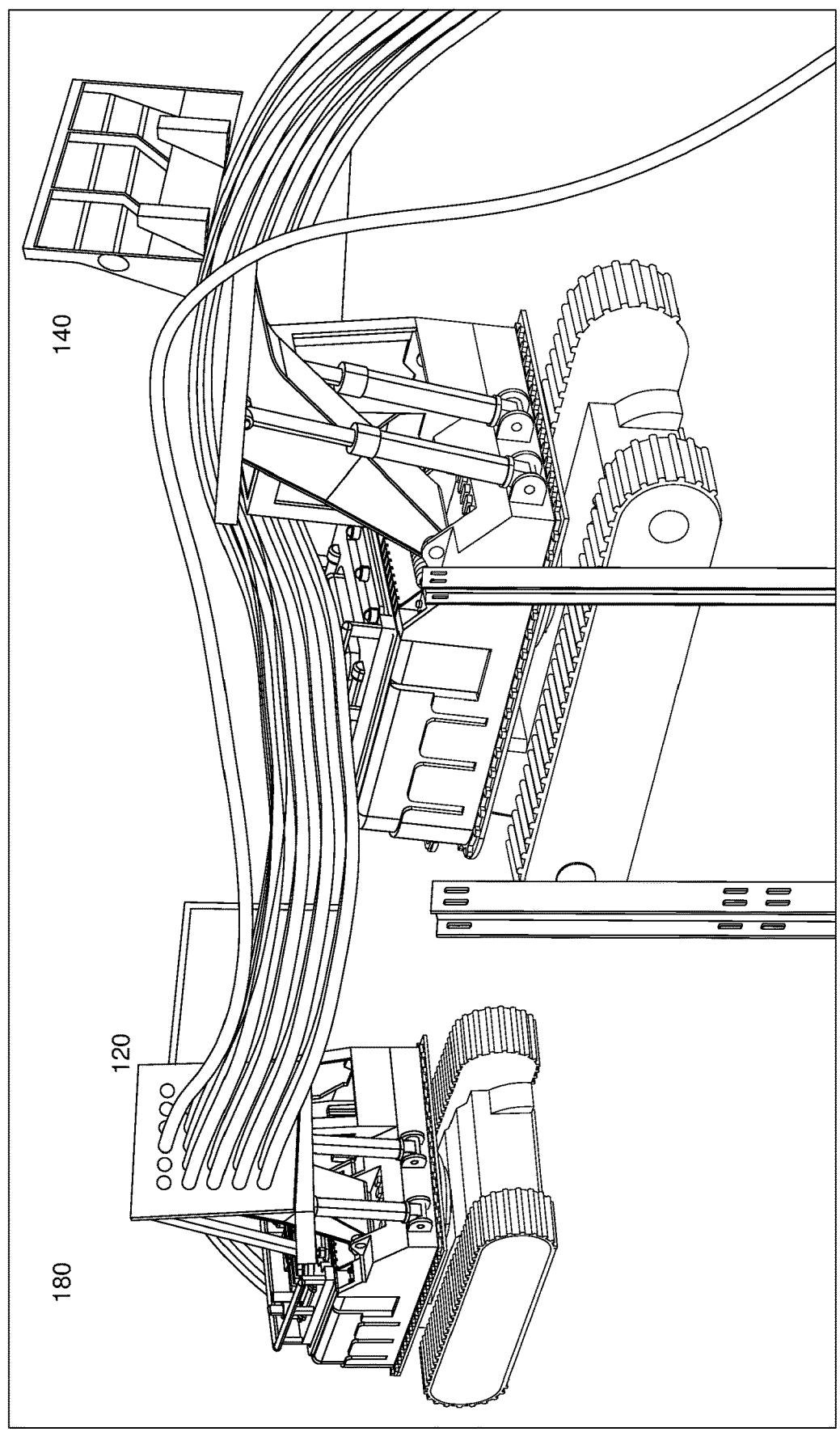
FIG. 5 illustrates a diagram of example arms of vehicles (e.g., a blade of a bulldozer) mechanically coupled to a cable pulling rig that is raised in the air with multiple cables connected to the cable pulling rig as well as an arm of a second vehicle (e.g., a forklift) with its arm raised in the air and the cables going through a wire management guide.

FIG. 5 illustrates a diagram of example arms of vehicles, for example a blade of a bulldozer, mechanically coupled to a cable pulling jig that is raised in the air with multiple cables connected to the cable pulling jig as well as an arm of a second vehicle, for example a forklift, with its arm raised in the air and the cables going through a wire management guide. Note, in FIG. 5, the cables are illustrated as having been pulled to their end destination and disconnected from the cable pulling jig 140 in order to be terminated on the intended electrical gear, such as a switchboard and/inverter. The multiple cables are generally pulled alongside a cable management system 180, such as a snake tray, for that job site. The bulldozer is the lead vehicle with the cable pulling jig 140 and the trailing vehicle is the forklift attached to the wire guide and management jig 120. The cable-pulling-rig-system is capable of pulling a significant amount of cabling without exceeding the pulling tension of the cable to be installed. The cable-pulling-rig-system can be used to pull a large and heavy amount of cables at a same time while the separate cables are kept orientated relative to each of the other cables being pulled at the same time. An example, minimum amount of cable that could be pulled could be, for example, 25,000 pounds. An example maximum cable being pulled in a single runs of driving the vehicles could be for example 100,000 pounds of cable. The cable-pulling-rig-system allows the construction crew to pull tens of thousands of feet of cable/wire with the cable pulling jig 140 and use a vehicle, for example, the earthmoving equipment itself, as the motive source of power for the pulling of the cable into its desired installation location, such as along a cable tray to each of the solar arrays.

The one or more vehicles can include an earthmover, a forklift, a bulldozer, a tractor, and any combination of these, to act as i) a main energy source, ii) a stabilizing platform with sufficient weight to pull the multiple cables, and iii) a movement source with off-road traction during the pulling of the multiple cables from a delivery vehicle to a target [e.g., final] destination in a cable management system 180. Generally, 1) one vehicle can mechanically couple to a mechanical coupling to mechanically connect to wire guide and management jig 120 and 2) a second vehicle can mechanically couple to a different mechanical coupling to mechanically connect to cable pulling jig 140. The cable-pulling-rig-system can be further derived by combining several vehicles with cable pulling jig 140 and the wire guide and management jig 120, such as earth moving platforms, into a larger, single tractor that can handle the workload as a single unit coupling to both the cable pulling jig 140 and the wire guide and management jig 120. Thus, the cable-pulling-rig-system can use the earth moving equipment as a cable/wire pulling tool for the electrical cable installation.

As discussed, the wire guide and management jig 120 can be constructed and designed to be installed (welded, bolted, etc.) on the head and/or an arm of a piece of a vehicle (e.g., earthmoving equipment, a tractor, etc.), rather than as a stand-alone piece of equipment. The cable-pulling-rig-system can be a wire pulling device or rig that allows for a generic/common mechanical coupling to mechanically connect to a coupling on a specific part of a vehicle, such as earthmoving equipment and/or tractor. This generic/common mechanical coupling to a common coupling of a vehicle can exactly match industry-standard couplings for backhoes, bulldozers, earthmoving, and tractor-type equipment commonly used in the construction industry.

Figure 6B:
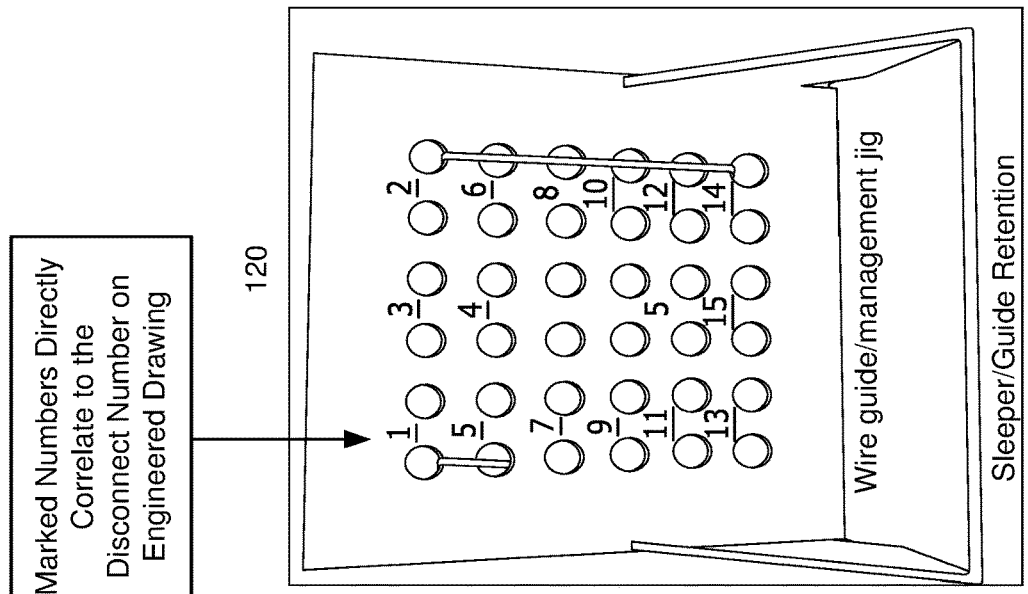
FIGS. 6A and 6B illustrate diagrams of an example the identifying labeled holes for the multiple cables to be pulled through that wire guide and management jig as well as a layout of an example engineering drawing for rows of solar power arrays and their example electrical disconnect or another piece of electrical gear corresponding to the marked identifying numbers of the cables.
Figure 6A:
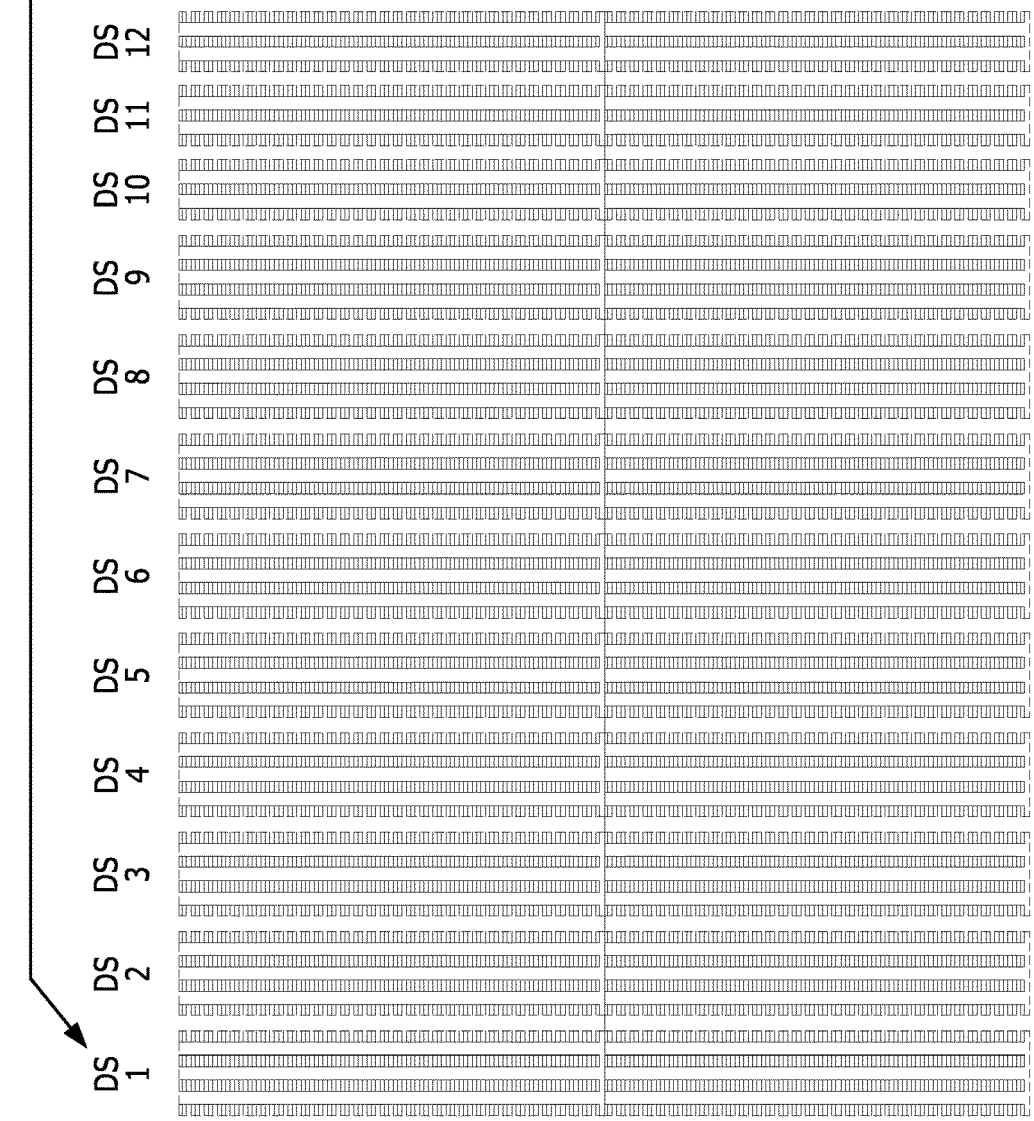

FIGS. 6A and 6B illustrate diagrams of example identifying labeled holes for the multiple cables to be pulled through that wire guide and management jig as well as a layout of an example engineering drawing for rows of solar power arrays and their example electrical disconnect or another piece of electrical gear corresponding to the marked identifying numbers of the cables. For example, identifying the first two holes in the plate of the wire guide and management jig 120 as number 1 in order to directly correlate to, for example, the positive and negative cables of electrical disconnect number 1 on the engineering drawing. Thus, the cable coming from the cable reel and pulled to the electrical disconnect in this example would be cable DS 3. The identifying labeled holes can either be made permanent identifications or temporary early written on the plate of the wire guide and management jig 120 in for example chalk. The construction of the wire guide and management jig 120 and cable pulling jig 140 can have an essentially identical construction. The difference between the two plate can be the hole configuration. However, the wire guide and management jig 120 can have a specific bushing installed and/or have the edges of the hole rounded off in the 2" cut openings to minimize cable jacket damage. Each hole in the plate for both the wire guide and management jig 120 and the cable pulling jig 140 can have a label/number by that hole. Thus, if a plate had 4 rows of holes across and 4 columns of holes from bottom to top, then 16 different label/numbers would be on the plate, each label/number uniquely identifying its hole. The wire guide and management jig 120 can have a plate with labeled (e.g., numbered) holes for the cables to be pulled through. Each cable, in the cable pull, is typically routed through its corresponding hole in the plate of the wire guide and management jig 120.

FIGS. 3A and 3B illustrate diagrams of an example cable pulling jig constructed from a metal plate with its set of identifying labeled hooks for prefabricated eyelets crimped onto an end of each of the multiple cables; and thus, temporarily coupled to that cable pulling jig. The set of identifying labeled hooks are numbered 1 through 15 and number 500. Note, the plate used in wire guide and management jig 120 is very similar to the cable pulling jig 140 in order to assist in preventing the cables from being tangled when being pulled. The holes of the cable pulling jig 140 can have eye hooks and double nutted bolt system to secure the eye hooks in the location of the hole in the plate.

Figure 7:
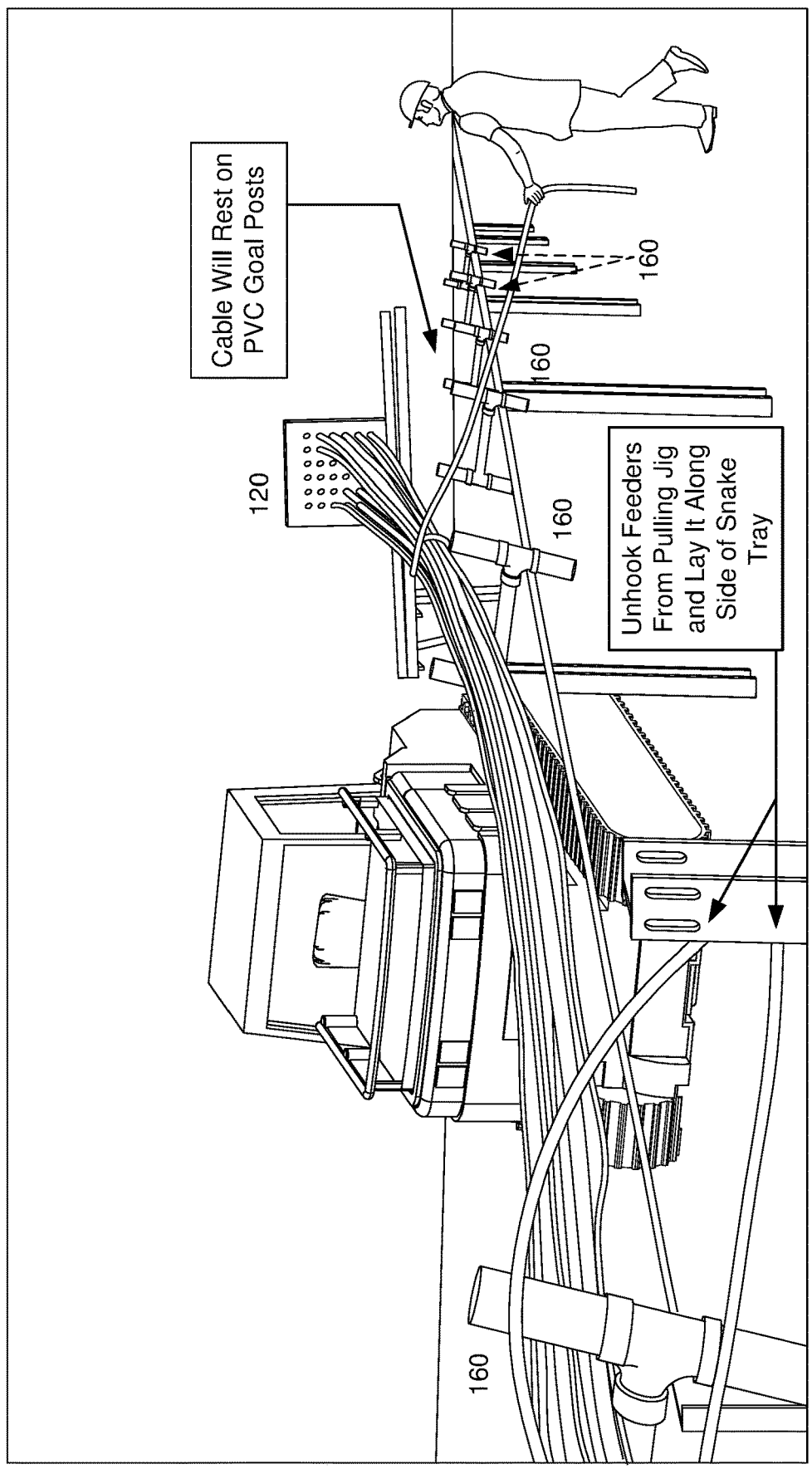
FIG. 7 illustrates a diagram of an example cable pulling jig attached to a steel beam to act as a mechanical coupling (e.g., retention guide) welded to the arms (e.g., forks) of a forklift, where the forklift's arms are raised into the air.

FIG. 7 illustrates a diagram of an example cable pulling jig attached to a steel beam via a mechanical coupling (e.g., retention guide) welded to the arms (e.g., forks) of a forklift, where the forklift's arms are raised into the air. The cable pulling jig 140 and attached cables are being held cantilevered over the vertical support posts. The multiple cables will rest on the vertical support posts (e.g., PVC posts in a shape of a goal post) and after the cables are pulled to their eventual end location. Next, the loops on the end of the cables can be unhooked from the hooks of the cable pulling jig 140. The multiple cables were either laid inside or alongside the cable management system 180, such as a closed cable tray or open cable tray structure such as a snake tray.

Figure 8:
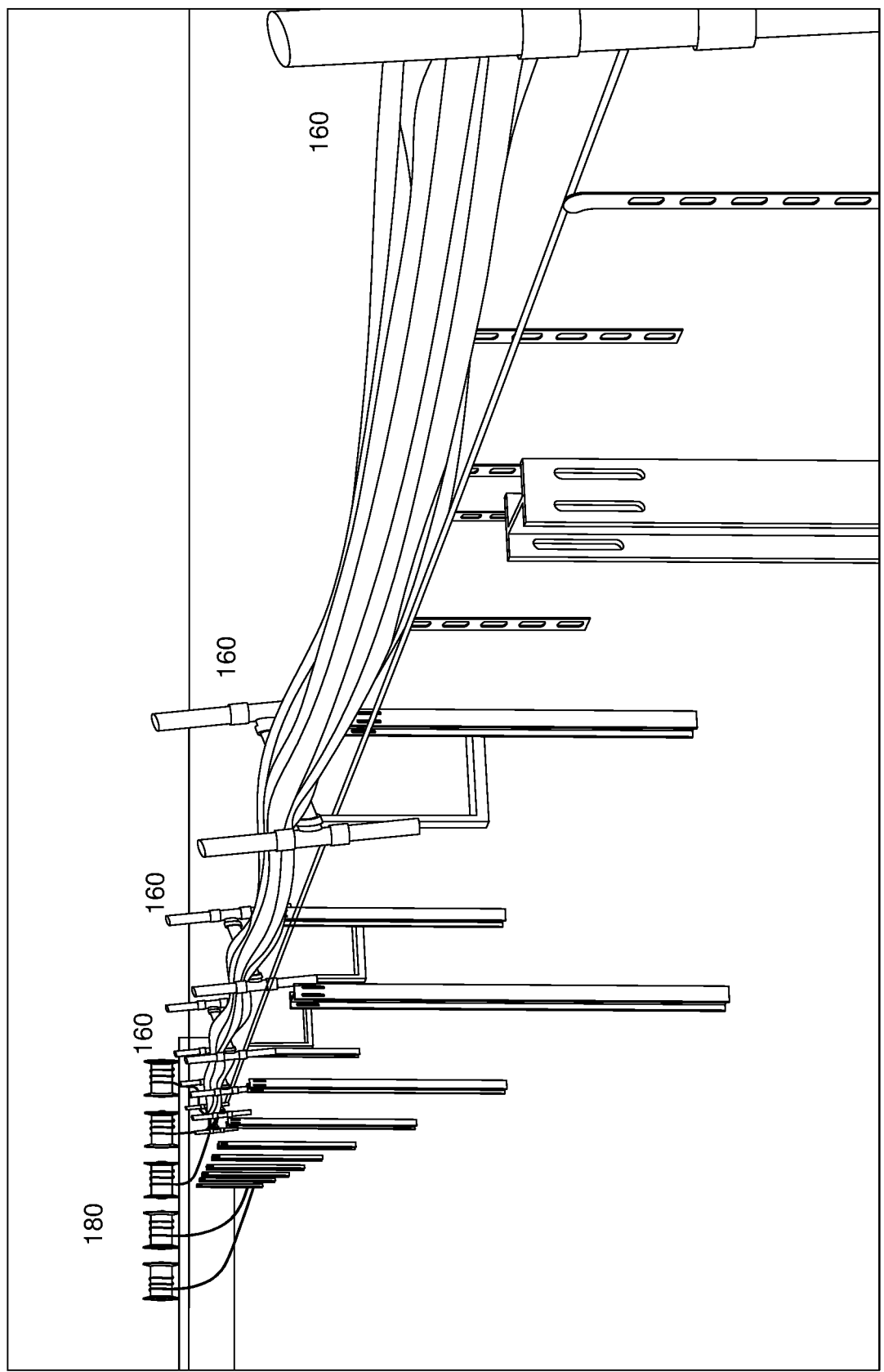
FIG. 8 illustrates a diagram of an example tail/trailing portion of the multiple cables resting on top of the vertical support posts as the vehicle with the cable pulling jig has already pulled the multiple cables to a location later down from the cables being shown.

FIG. 8 illustrates a diagram of an example tail/trailing portion of the multiple cables resting on top of the vertical support posts as the vehicle with the cable pulling jig has already pulled the multiple cables to a location later down from the cables being shown. The multiple cables can be cut or still attached to the cable reel. The multiple cables lay and rest above the ground on vertical support posts of the cable tray during the pulling of the cables. In addition, the vertical cable support posts 160 are constructed to support a weight of the multiple cables and have the vertical cable support posts 160 rest on the vertical cable support posts 160 (e.g., PVC goal posts) as the multiple cables are pulled by the cable pulling jig 140 coupled to the first vehicle. The vertical cable support posts 160 system of, for example, PVC tubes can help to relieve rotational and dragging forces on the plate of the wire guide and management jig 120.

FIG. 9 illustrates a diagram of an example wire guide and management jig having its set of holes in the steel plate to maintain cable logistics of an identity of each cable being pulled as well as to maintain each separate cable's orientation relative to another cable being pulled at the same time, which helps to prevent the multiple cables from i) tangling ii) getting out of alignment, and iii) any combination of both, while being pulled. The set of holes in the plate supports the weight of the multiple cables without deforming even when dragging thousands of pounds of cables. Again, the plate can be made from one inch to two inch thick steel. The set of holes in the plate also spaces out the multiple cables such that they can easily go into a cable management system 180 such as a closed cable tray or open cable tray structure, such as a snake tray. Note, each layer of cable is laid into its layer of snake tray click structure and a piece of PVC pipe can be used to maintain a delineation between rows of cables laid into its corresponding row of snake tray click structure. The cable logistics and pre-pulling material configuration are important to the success of the cable-pulling-rig-system and the specific installation motion it supports. A cable can be first cut to length and spooled according to pull or pulled and then cut.

The cable-pulling-rig-system replaces several people with one or more vehicles coupled (e.g., welded to forklift) to the cable pulling jig 140 to pull the cable and the wire guide and management jig 120 to manage the organization of the cables as they are pulled. The cable-pulling-rig-system minimizes a need for people to handle or physically pull cable from the cable reel when compared to current practices.

Referring back to FIG. 5, some possible cable pulling tools and systems are stand-alone systems and require input AC power; however, the wire guide and management jig 120 and the cable pulling jig 140 with the mechanical coupling to the vehicle does not require AC power/electricity to operate and is mechanically interchangeable with other apparatus and mechanical couplings for the earthmover or tractor, such as a backhoe bucket, blade or vibrating hammer. The cable-pulling-rig-system can have the wire guide and management jig 120 and cable pulling jigs 140 installed as a demountable system on a vehicle purposely built for this activity. Thus, the vehicle can mate up to multiple different fabricated wire guide and management jigs 120 and cable pulling jigs 140, which are selected depending on the current scenario, and then this would be much like changing the bucket on a backhoe.

FIGS. 10A and 10B illustrate diagrams of multiple views of examples of multiple cables having been pulled down a row of solar arrays and installed into their respective cable management system. The example cable management system 180 (e.g., snake tray click structure) has six layers deep of multiple cables and six cables across. Each cable goes into its individual slot in the rectangular open cable tray. In this example, an open cable tray structure exists every 10 feet or so running from the beginning of the solar array and then progressing down to the end of the solar array in order to secure the cables in place and in a safe manner.

Again see FIGS. 3A and 3B, the cable-pulling-rig-system can use a crimped end that is placed on each cable, allowing for a reversible connection to the hooks installed on the cable pulling jig. Once the cable is pulled to its final location and ready to be installed, the crimped ends are cut and the cable stripped and terminated as a final installation.

The cable-pulling-rig-system can focus on the installation of exposed-to-air power cabling, for example, used in the collector arrays of large solar power installations. The cable-pulling-rig-system, with slight modification to the cable management system 180 or project type, can also be used in a host of other industries such a mining, oil and gas extraction and processing, heavy industrial, data centers and any commercial or industrial application that uses large, numerous cables installed indoors or outdoors in a structured cable management system 180, such as an open or closed cable tray or its equivalent.

The cable-pulling-rig-system significantly reduces installation time by more than 90% over existing practices. The cable-pulling-rig-system is agnostic to both the type of cable, such as a power cable, signal cable, etc., and manufacturer of cable to be pulled/installed as well as the cable tray/cable management system 180 through which the cable is being pulled. The cable-pulling-rig-system also increases worker safety significantly by reducing physical contact with the cable and reduce the amount of weight that a craftsman is forced to lift when undertaking this type of work.

Derivative uses of the cable-pulling-rig-system can also be implemented. The cable-pulling-rig-system itself is basically fabricated jigs for guiding and pulling cables/wire, such as power cables, and use of one or more vehicles as an energy source to pull the cables/wires. For example, the cable-pulling-rig-system may be adapted for other environments, for example, indoor installations (versus solar array installation), where some moveable winch-type pulley is the motive power source for the pulling of the cables/wires, and then a tractor or earthmover would not be required. The cable-pulling-rig-system can be adapted to lay and/or pull other types of cable on the site, such as medium voltage cable laid in open trenching, wiring for a local area network, and other long runs of wire/cable.

Example Process

The cable-pulling-rig-system can be used in a series of steps.

Step 1. First, the cable can be ordered to a specific length and type of cable for the work. The delivery of the cable is via trailer-mounted large cable reels (see FIG. 4 for example). These cable reels can be the typical, wooden cable reels that the wire comes from the manufacturer. The cables can be cut to length and wound onto the reels prior to arrival. The delivery vehicle is provided to our specification by our cable supplier or an equipment rental supplier. These suppliers can vary from project to project.

Once the cable arrives on site, the delivery vehicle with the cable reels is directed to the installation location and is parked at the end of the solar array row onto which the cable is to be pulled. The wire that's spooled on the reels on the delivery vehicle are segregated by electrical function or wire type. All of those instructions can be required for proper cable-pulling-rig-system operation, such as guidance on how much wire can be pulled through the wire guide and management jig 120 at the fastest rate, with the highest degree of safety, to the highest quality of installation, and with the least amount of cable damage. All of those instructions can be based on experience.

The wire guide and management jig 120 and the cable pulling jig 140 can be installed on, for example, a ¾" boot on a standard 4"×4" boot on a small-to-medium earth mover, similar to a Bobcat XXX or Cat D3 series earth mover. The earth movers will be required to lift the cable guide jig and the wire guide and management jig 120 at least 6 feet in the air but may be required to lift the cables up to, for example, 12 feet above the ground.

Set up pre-loaded reels/spools of cable on a bed of a trailer (e.g., delivery truck) so that the middle, front facing cable reels of cable for the longer feeder cable pulls are directly perpendicular with the cable tray (e.g., snake tray). The cable reels of cable near the front and the back will be angled toward the cable management system 180, allowing all the feeder cables to be pulled into the cable management system 180 (e.g., cable tray). Also, the crew can put prefabricated eyelets onto the feeder leads of the multiple cables.

Step 2. Shakeout and set up a series of vertical cable support posts 160 (e.g., a set of PVC tubes). Each vertical cable support post 160 can be a set of PVC tubes formed into a goal post shape by zip tying one side of the goal post to each cable tray support post (see FIG. 8 for example). These vertical cable support posts 160 will prevent damage to the feeder cables as they cross over the cable tray brackets. The vertical cable support posts 160 prevent abrasions from the cable coming in contact with the snake tray system and vice versa. The vertical cable support posts 160 can have a lubricant applied to the surface of the vertical cable support posts 160 that come into contact with that surface to assist in the cable pull. The vertical cable support posts 160 raise the cables being pulled into the air rather than being pulled with the majority of the cables coming in contact with the ground. The cables not being dragged on the ground during a cable pull operation can prevent things like dirtying the cable, any ground friction on the cable when the cable is being pulled, and lessens damage potential to the cables.

Step 3: Circuit labeling with identifying labels is made on each feeder cable coming from its corresponding reel/cable reel (see FIGS. 6A and 6B for example). The crew can use the circuit labeling with identifying labels that comes on the cable reels of cable, to feed the cable to corresponding labeled holes in the wire guide and management jig 120. The labeled numbers correspond to the circuit/disconnect labels on the engineered drawings. Thus, the identifying labels (e.g., marked numbers) next to the holes in the wire guide and management jig 120 directly correlate to the disconnect number on engineered drawing and the circuit labeling with identifying labels on the leads of the cables. As typical, all of the cables for a particular cable tray (e.g., snake tray) are pulled together as a group of cables, the marked numbers and/or symbols used as identifying labels on the reels/cable reels of cable, wire guide and management jig 120, and cable pulling jig 140 cooperate to maintain cable logistics of an identity of each cable being pulled.

Step 4. Each cable is threaded through its desired hole in wire guide and management jig 120 (see FIGS. 1A and 1B for example) and then tied off to, for example, a hook on the cable pulling jig 140 with, for example, an eyelet. The cable count varies from installation to installation, but the maximum amount of cable to be pulled or managed in a single run is limited to the number of holes in the wire guide and management jig 120.

With the feeders of the multiple cables already pulled through the wire guide and management jig 120, then hook the prefabricated eyelets on the cables on to the hooks built into the plate of the cable pulling jig 140. Note, at this point, the cable pulling jig 140 is mechanically coupled to a vehicle such as a bulldozer (see FIGS. 3A and 3B for example). Also, each hook of the cable pulling jig 140 will have the circuit labeling with identifying labels according to the engineered drawing. Again, each set of hooks of the cable pulling jig 140 corresponds to the circuit labeling on the engineering drawing. Thus, for the cable installation, the requisite cables are drawn from the delivery vehicle-mounted reels, drawn through the matrix of holes in the wire guide and management jig 120 and then connected to the cable pulling jig 140.

Step 5. Once the cable is threaded through the wire guide and management jig 120 and tied off to the cable pulling jig 140, then at least the cable pulling jig 140 and its attached cables are elevated to the initial installation height. In an example, the vehicle can raise its arm/forklift/front metal blade; and thus, the attached cable pulling jig 140 and connected feeder cables into the air and over each vertical cable support post 160 as the vehicle drives itself and the attached cables to its desired location of, for example, the electrical inverter at end of the cable tray (e.g., snake tray). (See FIG. 5 for example).

Thus, the vehicle, such as a bulldozer, is used as an energy source and movement to pull the feeder cables down the length of the snake tray, allowing the cables to rest on top of the vertical cable support posts 160 (e.g., PVC goal posts) as they are pulled. The vehicle can raise its arm/forklift/front metal blade; and thus, the attached cable pulling jig 140 and connected feeder cables into the air and over each vertical cable support post 160 as the vehicle drives itself and the attached cables to its desired location.

Two operations occur—Performing the cable pulling first and then perform the cable installation into the cable management system 180. However, as discussed, a single vehicle can mechanically couple to both the cable pulling jig 140 and the wire guide and management jig 120. Also, each jig can mechanically couple to its own vehicle.

In an example, once the cable pulling jig 140, the wire guide and management jig 120, and their attached cables are elevated, a pair of earth movers now begin to move forward, in parallel, to the solar panel mounting piers. As the cable pulling jig 140 and the wire guide and management jig 120 move down the line, craftsmen are working behind and in parallel to the two jigs. The cables are elevated/lifted over array piers and dressed into place by the electricians. As discussed, the cables can rest on the vertical cable support posts 160 (e.g., PVC Goal Posts). (See FIG. 8 for example). Thus, as the vehicles and their mechanically coupled jigs progress in parallel down the row of solar arrays, workers are taking the cable that's being pulled over the cable management system 180 and laying the cable into its proper place.

Alternatively, the cables can be pulled by the vehicle coupled to the cable pulling jig 140. Sequentially, sometime after the cable has been pulled, then the vehicle mechanically coupled to the wire guide and management jig 120 can proceed down the row to allow the workers to laying the cable into its proper place in the cable management system 180 such as a snake tray. Each cable is laid into its corresponding snake tray "click".

Step 6. Once the vehicle pulling the cables reaches its target destination (e.g., the last row of a disconnect or other electrical connection), the crew can unhook the prefabricated eyelets on the cables from the cable pulling jig 140 and lay each cable along the side of the snake tray. The crew can continue this process until the final feeder cables are pulled out and laid next to the snake tray. Next, the crew can disconnect any remaining feeder cables from the cable pulling jig 140 and stage the vehicle (e.g., bulldozer) at the next block to be pulled. Note, in an embodiment, when a cable is completely pulled off the cable reel, the crew can half hitch the cable end to the reel trailer's strapping points.

Step 7: Next, additional operations can occur during performance of the cable installation into the cable management system 180. The crew can use a strut support jig cooperating with the wire guide and management jig 120 to space out the feeder cables to their respective snake tray "click" levels (see FIGS. 10A and 10B for example). Next, the crew can use a layer separator (e.g., PVC tube) to delineate/maintain a separation layers of cables that was being maintained by the wire guide and management jig 120. The crew can slide the layer separator, such as 5' pieces of PVC tubes, in between each set of the feeder cables (Top to Bottom). This will cause the feeder cables on the higher elevations to stay on top of the messenger wire, allowing the bottom elevation feeder cables to be easily identified and seated into the bottom click. The crew can remove a layer separator (e.g., PVC tube) that delineates "click" levels when putting the cable feeders in their corresponding snake tray "clicks." Once the bottom click is seated and the next click is laid, the crew can remove the next elevation's layer separator (e.g., PVC tube), which will cause the feeder cables to fall into the snake tray click. The crew can continue this process until each elevation is seated in the snake tray clicks. The crew can also re-use the layer separator PVC as the skid steer drives down the snake tray. The disconnects from the engineered drawing have pre-designated slots in the snake tray clicks (see FIGS. 6A and 6B). Once the last feeder cables have been laid into the snake tray, the crew can remove any leftover cable from the wire guide and management jig 120 and stage the skid steer at the next block to be pulled. The final pulled and installed cables are secured in place. All of the pulled cables rest in the snake tray clicks form a rectangular pattern/are square to the world.

Step 8. The crew can clean up scrap layer separators (e.g., PVC) and wire, as well as any leftover snake tray hardware. The final installation of cables into the cable management system 180 can look like FIGS. 10A and 10B, with the correct disconnects in their designated click/slot in the open cable tray.

References in the specification to "an embodiment," "an example", etc., indicate that the embodiment or example described may include a particular feature, structure, or characteristic, but every embodiment may not necessarily include the particular feature, structure, or characteristic. Such phrases can be not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A cable pulling system, comprising:
   a cable pulling jig,
   a wire guide and management jig,
   a mechanical coupling configured to attach the cable pulling jig to a first vehicle to pull multiple cables,
   where the wire guide and management jig is constructed to help manage the multiple cables to prevent the multiple cables from i) tangling ii) getting out of alignment, and iii) any combination of both, while being pulled, and
   one or more metal tubes are configured to couple the wire guide and management jig to act as a counter weight stabilizer to assist in stabilizing the wire guide and management jig and the first vehicle coupled to the wire guide and management jig when pulling the multiple cables.

2. The cable pulling system of claim 1, where the cable pulling jig is constructed to draw the multiple cables off a delivery vehicle, where the multiple cables each on its own cable reel are located.

3. The cable pulling system of claim 2, where the cable pulling jig is configured to draw the multiple cables off cable reels through the wire guide and management jig, and then the cable pulling jig is configured to temporarily attach to the multiple cables when they are pulled through the wire guide and management jig to a desired location.

4. The cable pulling system of claim 1, where the cable pulling jig is configured to draw the multiple cables off a delivery vehicle through the wire guide and management jig to guide each pulled cable into a job site's desired cable management system.

5. The cable pulling system of claim 1, where the first vehicle is selected from a group consisting of an earthmover, a forklift, a bulldozer, a tractor, and any combination of these, to act as i) an energy source, ii) a stabilizing platform with sufficient weight to pull the multiple cables, and iii) a movement source with off-road traction during the pulling of the multiple cables from a delivery vehicle to a target destination in a cable management system.

6. The cable pulling system of claim 1, where the wire guide and management jig is constructed from a steel plate with a set of identifying labeled holes for the multiple cables to be pulled through and has a mechanical coupling to attach to the first vehicle, where the steel plate with the set of identifying labeled holes is constructed such that each cable, in the multiple cable pull, is configured to individually be routed through its corresponding identified labeled hole in the plate of the wire guide and management jig, where the set of identifying labeled holes in the steel plate are configured to maintain cable logistics of an identity of each cable being pulled as well as are geographically located in the steel plate to maintain each separate cable's orientation relative to another cable being pulled at the same time, which helps to prevent the multiple cables from i) tangling ii) getting out of alignment, and iii) any combination of both, while being pulled.

7. The cable pulling system of claim 1, where the cable pulling jig is constructed from a plate with a set of identifying labeled 1) holes, 2) prefabricated eyelets, 3) hooks, and 4) any combination of these, for the multiple cables to be temporarily coupled to the cable pulling jig.

8. The cable pulling system of claim 1, where the cable pulling jig also has a mechanical coupling to mechanically connect to an arm of the first vehicle, where the cable pulling jig is constructed to use the mechanical coupling to couple to the first vehicle, which then is configured to drive the multiple cables temporarily coupled to the cable pulling jig off their reels to a desired location, and where the arm of the first vehicle mechanically coupled to the cable pulling jig is configured to lift the multiple cables temporarily coupled to the cable pulling jig cantilevered over top of a cable tray when being pulled.

9. The cable pulling system of claim 1, further comprising:
   a set of vertical cable support posts, where the cable pulling jig is configured to be coupled to the first vehicle as an energy source and movement source to pull the multiple cables down a length of a cable management system, where the set of vertical cable support posts are constructed to support a weight of the multiple cables and have the multiple cables rest on the vertical cable support posts as the multiple cables are pulled by the cable pulling jig coupled to the first vehicle.

10. A method for a cable pulling system, comprising:

constructing a cable pulling jig, constructing a wire guide and management jig, constructing a mechanical coupling to attach the cable pulling jig to a first vehicle to pull multiple cables, constructing the wire guide and management jig to help manage the multiple cables to prevent the multiple cables from i) tangling ii) getting out of alignment, and iii) any combination of both, while being pulled, and constructing one or more metal tubes to couple the wire guide and management jig to act as a counter weight stabilizer to assist in stabilizing the wire guide and management jig and the first vehicle coupled to the wire guide and management jig when pulling the multiple cables.

11. The method for the cable pulling system of claim 10, further comprising:

constructing the cable pulling jig to draw the multiple cables off a delivery vehicle, where the multiple cables each on its own cable reel are located.

12. The method for the cable pulling system of claim 11, further comprising:

constructing the cable pulling jig to draw the multiple cables off cable reels through the wire guide and management jig, and then the cable pulling jig is configured to temporarily attach to the multiple cables when they are pulled through the wire guide and management jig to a desired location.

13. The method for the cable pulling system of claim 10, further comprising:

constructing the cable pulling jig to draw the multiple cables off a delivery vehicle through the wire guide and management jig to guide each pulled cable into a job site's desired cable management system.

14. The method for the cable pulling system of claim 10, where the first vehicle is selected from a group consisting of an earthmover, a forklift, a bulldozer, a tractor, and any combination of these, to act as i) an energy source, ii) a stabilizing platform with sufficient weight to pull the multiple cables, and iii) a movement source with off-road traction during the pulling of the multiple cables from a delivery vehicle to a target destination in a cable management system.

15. The method for the cable pulling system of claim 10, further comprising:

constructing the wire guide and management jig from a steel plate with a set of identifying labeled holes for the multiple cables to be pulled through and has a mechanical coupling to attach to the first vehicle, where the steel plate with the set of identifying labeled holes is constructed such that each cable, in the multiple cable pull, is configured to individually be routed through its corresponding identified labeled hole in the plate of the wire guide and management jig, where the set of identifying labeled holes in the steel plate are configured to maintain cable logistics of an identity of each cable being pulled as well as are geographically located in the steel plate to maintain each separate cable's orientation relative to another cable being pulled at the same time, which helps to prevent the multiple cables from i) tangling ii) getting out of alignment, and iii) any combination of both, while being pulled.

16. The method for the cable pulling system of claim 10, further comprising:

constructing the cable pulling jig from a plate with a set of identifying labeled 1) holes, 2) prefabricated eyelets, 3) hooks, and 4) any combination of these, for the multiple cables to be temporarily coupled to the cable pulling jig.

17. The method for the cable pulling system of claim 10, further comprising:

constructing the cable pulling jig to have a mechanical coupling to mechanically connect to an arm of the first vehicle, where the cable pulling jig is constructed to use the mechanical coupling to couple to the first vehicle, which then is configured to drive the multiple cables temporarily coupled to the cable pulling jig off their reels to a desired location, and where the arm of the first vehicle mechanically coupled to the cable pulling jig is configured to lift the multiple cables temporarily coupled to the cable pulling jig cantilevered over top of a cable tray when being pulled.

18. The method for the cable pulling system of claim 10, further comprising:

using a set of vertical cable support posts, where the cable pulling jig is configured to be coupled to the first vehicle as an energy source and movement source to pull the multiple cables down a length of a cable management system, where the set of vertical cable support posts are constructed to support a weight of the multiple cables and have the multiple cables rest on the vertical cable support posts as the multiple cables are pulled by the cable pulling jig coupled to the first vehicle.

\* \* \* \* \*